US012791862B2

(12) United States Patent
Hofmann et al.

(10) Patent No.: US 12,791,862 B2
(45) Date of Patent: Nov. 10, 2026

(54) OPTICAL REPLICATION COMPONENT

(71) Applicant: Robert Bosch GmbH, Stuttgart (DE)

(72) Inventors: Johannes Hofmann, Tuebingen (DE); Andreas Petersen, Eningen (DE); Anna-Katharina Friedel, Wannweil (DE)

(73) Assignee: ROBERT BOSCH GMBH, Stuttgart (DE)

(*) Notice: Subject to any disclaimer, the term of this patent is extended or adjusted under 35 U.S.C. 154(b) by 240 days.

(21) Appl. No.: 18/693,214

(22) PCT Filed: Jan. 27, 2023

(86) PCT No.: PCT/EP2023/051962
§ 371 (c)(1),
(2) Date: Mar. 19, 2024

(87) PCT Pub. No.: WO2023/179935
PCT Pub. Date: Sep. 28, 2023

(65) Prior Publication Data

US 2024/0385445 A1 Nov. 21, 2024

(30) Foreign Application Priority Data

Mar. 24, 2022 (DE) ..................... 10 2022 202 921.6

(51) Int. Cl.
*G02B 27/01* (2006.01)

(52) U.S. Cl.
CPC .. *G02B 27/0172* (2013.01); *G02B 2027/0174* (2013.01); *G02B 2027/0178* (2013.01)

(58) Field of Classification Search
CPC ........ G02B 27/0172; G02B 2027/0174; G02B 2027/0178

(Continued)

(56) References Cited

U.S. PATENT DOCUMENTS 9,985,682 B2 5/2018 Khlat et al.
2016/0238845 A1 8/2016 Alexander et al.

(Continued)

FOREIGN PATENT DOCUMENTS

DE 102018218987 A1 5/2020
EP 1405123 B1 3/2007

OTHER PUBLICATIONS

International Search Report for PCT/EP2023/051962, Issued Apr. 21, 2023.

*Primary Examiner* — Bumsuk Won
*Assistant Examiner* — Mitchell T Oestreich
(74) *Attorney, Agent, or Firm* — NORTON ROSE FULBRIGHT US LLP

(57) ABSTRACT

An optical replication component, which is developed in planar fashion and has a front side and a back side. The optical replication component includes at least a first holographic optical element and a second holographic optical element. The first holographic optical element and the second holographic optical element are designed to reflect an image content striking the front side of the optical replication component in such a way that a first exit pupil and a second exit pupil situated spatially offset with respect to the first are produced with the image content. The optical replication component has an additional optical filter element for filtering at least a first light beam striking the back side of the optical replication component in a specific angle of incidence range and/or a specific wavelength range and/or with a specific polarization direction.

18 Claims, 3 Drawing Sheets

(58) Field of Classification Search
USPC ............................................................ 359/13
See application file for complete search history.

(56) References Cited

U.S. PATENT DOCUMENTS

| | | | | |
|---|---|---|---|---|
| 2020/0174255 | A1* | 6/2020 | Hollands | G02B 27/0103 |
| 2020/0225476 | A1* | 7/2020 | Urness | G02B 6/0061 |
| 2021/0124171 | A1* | 4/2021 | Kim | G02B 27/106 |

* cited by examiner

OPTICAL REPLICATION COMPONENT

FIELD

The present invention relates to an optical replication component. In addition, the present invention relates to an optical system comprising the optical replication component and to smart glasses comprising the optical system.

BACKGROUND INFORMATION

Smart glasses comprising a retinal scan display described in U.S. Pat. No. 9,985,682 B1.

From this starting point, an object of the present invention is to provide a replication component that prevents the occurrence of ghost images from the real environment of the replication component.

SUMMARY

To achieve this objective, a replication component according to the present invention. In addition, an optical system according to the present invention and smart glasses according to the present invention are provided.

According to an example embodiment of the present invention, the optical replication component is developed in planar fashion and has a front side and a back side. The optical replication component has at least a first holographic optical element and a second holographic optical element. The first holographic optical element and the second holographic optical element are designed to reflect an image content striking the front side of the optical replication component onto an eye 19 of a user of smart glasses in such a way that at least a first and a second exit pupil, which is situated spatially offset with respect to the first, are produced with the image content. The front side of the optical replication component is in this case oriented in the direction of the user's eye 19. The optical replication component comprises an additional optical filter element for filtering at least a first light beam striking the back side of the optical replication component in a specific angle of incidence range and/or a specific wavelength range and/or with a specific polarization direction. The optical filter element accordingly prevents first light beams, which strike the back side of the optical replication component in a specific angle of incidence range and/or a specific wavelength range and/or with a specific polarization direction, from passing through the optical replication component and subsequently striking the eye of the user of the smart glasses. The filtered first light beams incident under certain conditions are preferably light beams that without optical filter element would result in ghost images for the user of the smart glasses. A ghost image (often called ghosting in English) is a slightly visible, usually less luminescent copy of an image that is offset with respect to the main image. The phenomenon of the occurrence of ghost images when looking through optical replication components with at least one first and one second holographic optical element may be described (also mathematically) for example with the aid of the theory of the diffraction of light on volume holograms developed by Herwig Kogelnik. The optical replication component appears essentially transparent for a user at least when viewed from one viewing direction.

According to an example embodiment of the present invention, the first holographic optical element is preferably designed to produce the image data in the first exit pupil and the second holographic optical element is preferably designed to produce the image data in the second exit pupil. The optical replication component thus makes it possible that the same image data are produced simultaneously in exit pupils (eye boxes) that are spatially offset from one another and that the effective eye box is enlarged accordingly. In this connection, the first holographic optical element is designed in particular to reflect only a portion of the intensity of the projected image content onto the eye of the user. At least one further portion of the intensity of the projected image content is then subsequently deflected by the second holographic optical element in the direction of the second exit pupil.

According to an example embodiment of the present invention, preferably, the optical filter element is developed as a third holographic optical element, which is designed to reflect the incident first light beam. In this connection, the first holographic optical element preferably comprises first holographic lattice planes having a first lattice vector. The second holographic optical element comprises second holographic lattice planes having a second lattice vector. The third holographic optical element comprises third holographic lattice planes having a third lattice vector. The first lattice vector and the second lattice vector can be combined into a fifth lattice vector, which corresponds in particular to a mean of a sum of the first and the second lattice vector. The third lattice vector in this case corresponds to a mirroring of the fifth lattice vector at a mirror plane, which is oriented substantially perpendicularly with respect to a line connecting a point of incidence of the first incident light beam onto the third holographic optical element with a point between the first and second exit pupil, in particular a center point between the first and second exit pupil. Due to this mirrored functionality of the third holographic optical element with respect to the first holographic optical element and the second holographic element, first light beams, which without the optical filter element would result in ghost images, are reflected by the third holographic optical element. Alternatively, the first holographic optical element comprises first holographic lattice planes having the first lattice vector. The third holographic optical element comprises in turn fourth holographic lattice planes having a fourth lattice vector. A first straight line, which runs parallel to the first lattice vector, and a fourth straight line, which runs parallel to the fourth lattice vector, are situated relative to each other at an angular offset in a range from 10° to 30°. Thus, the first lattice vector and the third lattice vector are first of all sufficiently close together in order to allow for good congruence of the angle dependence and wavelength dependence of the diffraction efficiency of the first and of the third holographic optical element, which prevents the formation of ghost images.

Furthermore, however, the angular offset also prevents ghost images that could arise by reflection of the second light beams on the third holographic optical element. Furthermore, the fourth lattice vector in this case has a magnitude, in particular a local magnitude, in a range from 0.0395 1/nm to 0.0427 1/nm, preferably from 0.0418 1/nm to 0.0421 1/nm. This magnitude is particularly well-suited for the reflection of ghost images comprising primarily light beams of blue wavelength. Alternatively, the fourth lattice vector has a magnitude in a range from 0.0343 1/nm to 0.0368 1/nm, preferably from 0.0356 1/nm to 0.0362 1/nm. This magnitude is particularly well-suited for the reflection of ghost images comprising primarily light beams of green wavelength. Furthermore alternatively, the fourth lattice vector has a magnitude in a range from 0.0275 1/nm to 0.0302 1/nm, preferably from 0.0288 1/nm to 0.0294 1/nm.

This magnitude is particularly well-suited for the reflection of ghost images comprising primarily light beams of red wavelength. The third holographic optical element has a diffraction efficiency in a range from 20% to 95%, preferably in a range from 30% to 80%, particularly preferably in a range from 40% to 70%. When selecting the efficiency values of the third holographic optical element, attention should be paid to ensure that on the one hand first light beams are sufficiently filtered to prevent ghost images. On the other hand, however, attention should be paid to ensure that the transparency of the optical replication component is sufficient for the user of the smart glasses.

According to an example embodiment of the present invention, the optical filter element preferably comprises multiple holographic optical elements for reflecting first light beams in the specific angle of incidence range and a red wavelength range and/or first light beams in the specific angle of incidence range and a blue wavelength range and/or first light beams in the specific angle of incidence range and a green wavelength range.

Preferably, according to an example embodiment of the present invention, the optical filter element is developed as a wavelength-dependent light filter, in particular as a band-stop filter, which is designed to absorb or to reflect the incident first light beam within the specific wavelength range. The specific wavelength range refers to the wavelength range within which without the optical filter element ghost images would appear. The specific wavelength range concerns in particular first light beams in at least a wavelength range corresponding to a primary color of the retinal scan display system (red, green or blue). In particular, the effectiveness of the filter may apply to all three wavelength ranges in the same filter element. Preferably, the wavelength-dependent light filter is developed as an eyeglass lens. In particular, the eyeglass lens may be functionalized in such a way that it has the properties of an absorptive and/or reflective band-stop filter.

Preferably, according to an example embodiment of the present invention, the optical filter element is developed as a polarization filter, which is designed to suppress a polarization component of the first light beam at least partially. The polarization component is here oriented substantially along a vertical direction, which is in particular oriented vertically with respect to a plane formed by a main extension plane of a pair of smart glasses. In such polarized light, without optical filter element, the ghost images would be particularly clearly discernible for a user of the smart glasses. The polarization filter is preferably designed to suppress altogether at least 80%, in particular of the total intensity, of the polarization component. The polarization filter is furthermore preferably designed to suppress altogether at least 90%, in particular of the total intensity, of the polarization component of the first light beam. The polarization filter is preferably designed to suppress altogether at least 98%, in particular of the total intensity, of the polarization component of the first light beam.

Preferably, according to an example embodiment of the present invention, the first holographic optical element is developed as a first, in particular holographic, layer and the second holographic optical element is developed as a second, in particular holographic, layer. The first and the second layer are in this case arranged, in particular stacked, one above the other. The first layer is situated first in a sequence in the direction of the eye of the user. Alternatively, the first and second holographic optical element are developed as a common third, in particular holographic, layer. Such a layer made up of at least two holographic optical elements is also referred to as a multiplexing HOE (holographic optical element).

According to an example embodiment of the present invention, the optical filter element is preferably designed as an additional fourth layer, which is situated relative to the first and second holographic element in the direction of the incident first light beam, that is, facing away from the eye of the user. Preferably, the fourth layer is situated on the back side of the optical replication component, in particular on an outer surface of an eyeglass lens. Alternatively, the fourth layer is situated on an outer surface of the second holographic optical element. In particular, the fourth layer is designed as a holographic layer.

In particular, the first, second and fourth layer are integrated in the eyeglass lens. Alternatively, in particular, the third and fourth layer are integrated in the eyeglass lens.

A further subject matter of the present invention is an optical system for a virtual retinal display (retinal scan display).

According to an example embodiment of the present invention, the optical system includes at least:

a. an image source, which provides an image content in the form of image data, b. an image processing device for the image data, c. a projector unit having a time-modulated light source for generating at least a second light beam and having a controllable deflection device for the at least one second light beam for the scanning projection of the image content, d. the previously described optical replication component.

A "virtual retinal display" is to be understood in particular as a retinal scan display or a light field display, in which the image content is scanned sequentially by deflection of the at least second light beam, in particular of a laser beam at least of one time-modulated light source, such as, e.g., one or multiple laser diodes, and is imaged by optical elements directly onto the retina of the eye of the user. The image source is in particular designed as an electronic image source, for example as a graphics output, in particular a (integrated) graphics card, of a computer or processor or the like. The image source may be developed integrally with the image processing device of the optical system, for example. Alternatively, the image source may be developed separately of the image processing device and may transmit image data to the image processing device of the optical system. The image data in particular take the form of color image data, e.g., RGB image data. In particular, the image data may take the form of still images or of moving images, e.g., videos. The image processing device is preferably provided to modify the image data of the image source, in particular to distort, copy, rotate, offset, scale, and the like, the image data. The image processing device is preferably provided to produce copies of the image content, which are in particular modified, for example distorted, rotated, offset and/or scaled.

According to an example embodiment of the present invention, the projector unit is in particular set up to emit the image content from the image data in the form of scanned and/or rasterized second light beams. The projector unit comprises in particular a deflection device, preferably a MEMS mirror (micromirror actuator), at least for the controlled deflection of the second light beam of the light source of the projector unit. Alternatively or additionally, the deflection device comprises at least one switchable diffractive-optical element in the form of a phase and/or intensity modulator, which for example as a spatial light modulator (SLM) may be designed in a reflective type of construction, e.g., in a DMD or LCoS type of construction, or in a transmissive type of construction, e.g., as an LCD. In particular, the time-modulated light source is modulated in analog fashion, although an alternative TTL modulation for example is also not precluded.

A further subject matter of the present invention is a pair of smart glasses comprising the previously described optical system.

DETAILED DESCRIPTION OF EXAMPLE EMBODIMENTS

Figure 1:
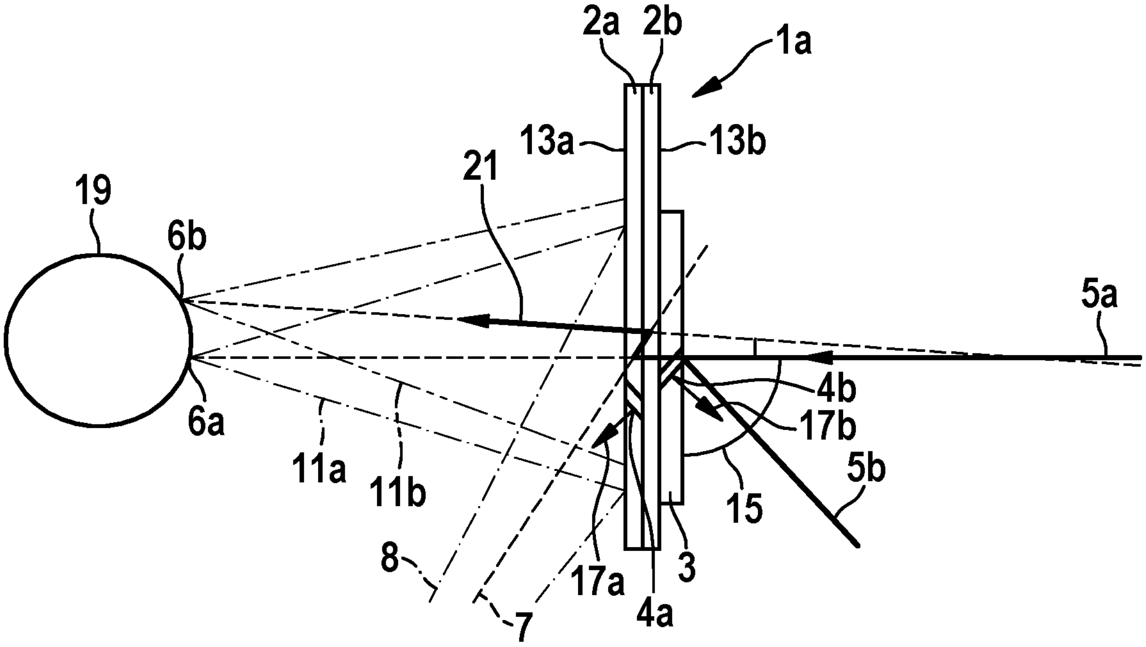
FIG. 1 shows a first specific embodiment of an optical replication component, according to the present invention.

FIG. 1 shows a first specific embodiment of an optical replication component 1*a*. The optical replication component 1*a* is in this case developed in planar fashion and has a front side 13*a* and a back side 13*b*. In this first specific embodiment, the optical replication component 1*a* has a first holographic optical element 2*a* and a second holographic optical element 2*b*. The first holographic optical element 2*a* and the second holographic optical element 2*b* are designed to reflect an image content striking the front side 13*a* of the optical replication component 1*a* in such a way that a first exit pupil 6*a* and a second exit pupil 6*b*, which is situated spatially offset with respect to the first, are produced with the image content. The image content is radiated by second light beams 7 within a projection region 8 onto the optical replication component 1*a*. A portion of the second light beam 7 is deflected by the first holographic optical element 2*a* in the direction of the first exit pupil 6*a* and thus the image data are produced in the first exit pupil 6*a*. A further portion of light beam 7, however, passes through the first holographic optical element 2*a* and is then deflected by the second holographic optical element 2*b* in the direction of the second exit pupil 6*b*. The image data are thus also produced in the second exit pupil 6*b*.

The optical replication component 1*a* additionally comprises an optical filter element 3 for filtering at least one first light beam 5*a* striking the back side 13*b* of the optical replication component 1*a* at a specific angle of incidence 15 and in a specific wavelength range. In this exemplary embodiment, the optical filter element 3 is designed as a third holographic optical element, which is designed to reflect the incident first light beam 5*a*. In this connection, the third holographic optical element comprises third lattice planes 4*b* having a third lattice vector 17*b*, which are here schematically illustrated. The first holographic optical element 2*a*, on the other hand, comprises schematically illustrated first lattice planes 4*a* having a first lattice vector 17*a*. The third lattice vector 17*b* corresponds in this case to a mirroring of the first lattice vector 17*a* at a mirror plane, which is formed in the illustrated exemplary embodiment at the point of incidence of the incident first light beam 5*a* through the main plane of extension of the optical filter element 3. The first light beam 5*a* is thus reflected by the optical filter element 3. The reflected first light beam 5*b* is here reflected in mirror image with respect to the second light beam 7 striking the first holographic optical element 2*a*.

Without the optical filter element 3, the first light beam 5*a* would be deflected by the first holographic element 2*a* in the direction of the second holographic optical element 2*b* and subsequently deflected by the second holographic optical element 2*b* in the direction of the second exit pupil 6*b*. This theoretical beam path is here illustrated schematically by arrow 21. If at this time, the pupil of the eye 19 of the user were in the first exit pupil 6*a* and second exit pupil 6*b*, then a ghost image would arise for the user. This is now prevented by the optical filter element 3.

In this exemplary embodiment of the present invention, the first holographic optical element 2*a* is developed as a first holographic layer and the second holographic optical element 2*b* is developed as a second holographic layer. The first and the second layer are in this case arranged, in particular stacked, one above the other. The first layer is situated first in a sequence, in particular a stack sequence, in the direction of the eye 19 of the user. The optical filter element 3 as the third holographic optical element is formed as an additional fourth layer, which is situated relative to the first 2*a* and second holographic element 2*b* in the direction of the incident first light beam 5*a*.

The third holographic optical element in this case has an efficiency of 50%. Thus, on the one hand, sufficient intensity of the first light beam 5*a* is reflected, while at the same time the optical replication component still appears sufficiently transparent for the user.

Figure 2:
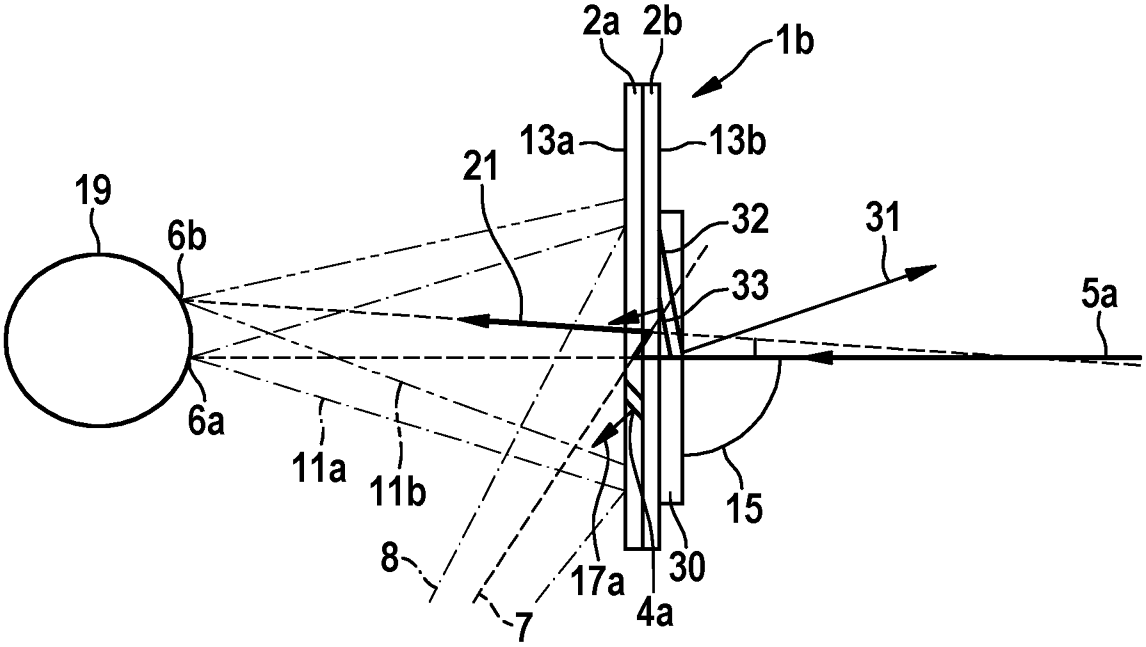
FIG. 2 shows a second specific embodiment of an optical replication component, according to the present invention.

FIG. 2 shows schematically a second specific embodiment of an optical replication component 1*b*. In this case, the first holographic optical element 2*a* again comprises first holographic lattice planes 4*a* having the first lattice vector 17*a*. In contrast to the first specific embodiment, the third holographic optical element has as the optical filter element 30 fourth holographic lattice planes 32 having a fourth lattice vector 33. The first lattice vector 17*a* illustrated here and the fourth lattice vector 33 illustrated here are arranged in this case at an angular offset of 20° relative to each other. The fourth lattice vector 33 has a magnitude, in particular a local magnitude, of 0.0415 1/nm. The incident first light beam 5*a* is thus reflected by the optical filter element 30 in the direction of the reflection direction 31.

Figure 3:
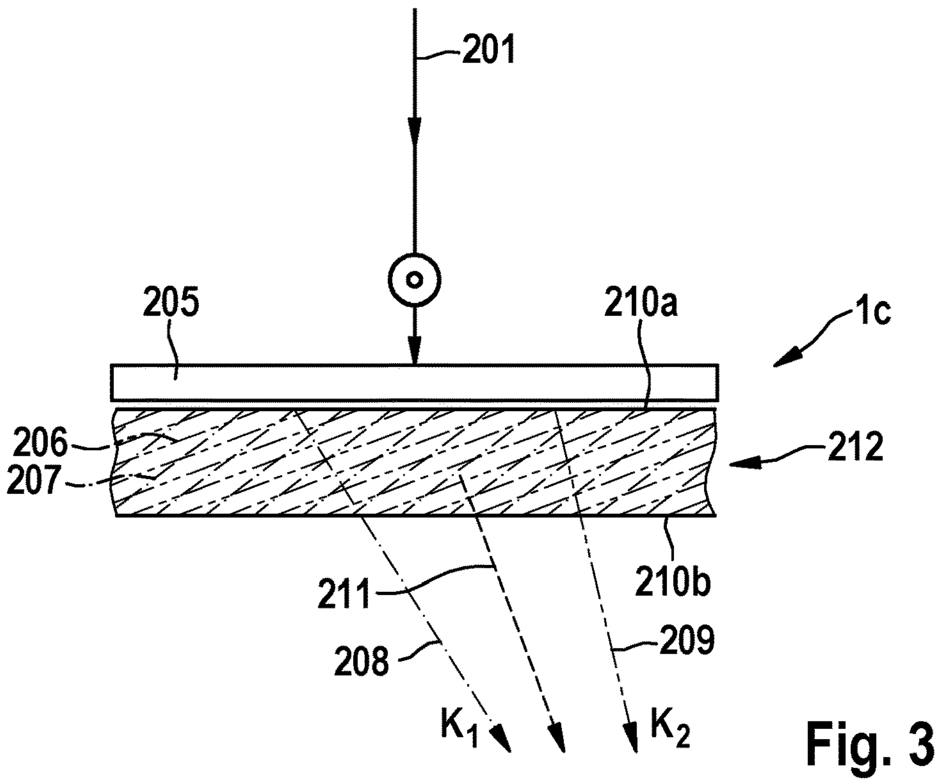
FIG. 3 shows a third specific embodiment of an optical replication component, according to the present invention.

FIG. 3 shows schematically a third specific embodiment of an optical replication component 1*c*. In this case, in contrast to the first specific embodiment, the first 210*a* and second holographic optical element 210*b* are developed as a common third layer 212. This common third layer 212 with the two integrated holographic optical elements 210*a* and 210*b* is also called a multiplexing HOE. The first holographic optical element 210*a* in this case has first lattice planes 207, which are offset with respect to the second lattice planes 206 of the second holographic optical elements 210*b*. The first lattice plane 207 has a first lattice vector 209 and the second lattice plane 206 has a second lattice vector 208. In addition, a fifth lattice vector 211 is illustrated, which is composed of the first lattice vector 209 and the second lattice vector 208. The fifth lattice vector 211 is in particular a mean of a sum of the first lattice vector 209 and the second lattice vector 208.

The optical filter element 205, which as a fourth layer is stacked with the third layer 212 and is situated in the direction of the first incident light beam 201, in this case takes the form of a polarization filter. The first light beam 201 in this case primarily takes the form of a polarization component, which is oriented substantially along a vertical direction. The vertical direction in this case indicates in particular a direction that is oriented vertically with respect to a plane formed by a main plane of extension of a pair of smart glasses. The polarization filter 205 is used to suppress this light at least partially.

Figure 4:
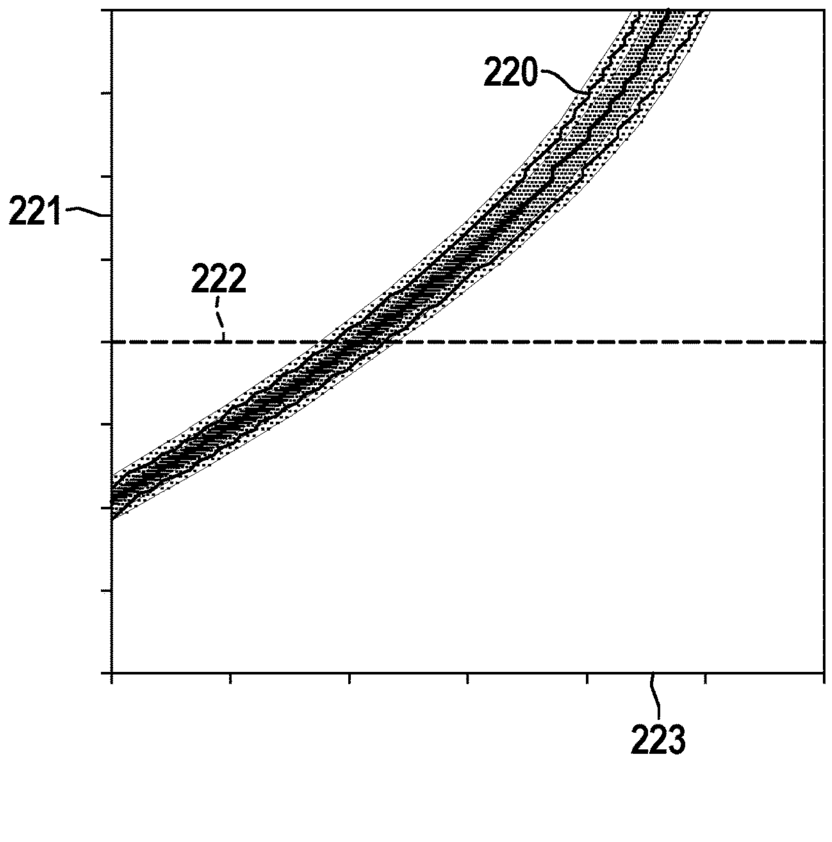
FIG. 4 shows the occurrence of ghost images in a specific angle of incidence range and/or in a specific wavelength range, according to the present invention.

FIG. 4 shows a diagram illustrating in color-coded fashion a calculated optical efficiency of the ghost image formation, the X axis 223 representing the wavelength of the incident first light beam and the Y axis 221 representing the angle of incidence of the incident first light beam. The Y axis section 222 here indicates an angle of incidence, which extends relative to the surface vector of an outer surface of the optical replication component, in particular of the first holographic optical element. The area 220 illustrated in the diagram describes the specific angle of incidence range and specific wavelength range, in which ghost images may occur for the user of the smart glasses.

Figure 5:
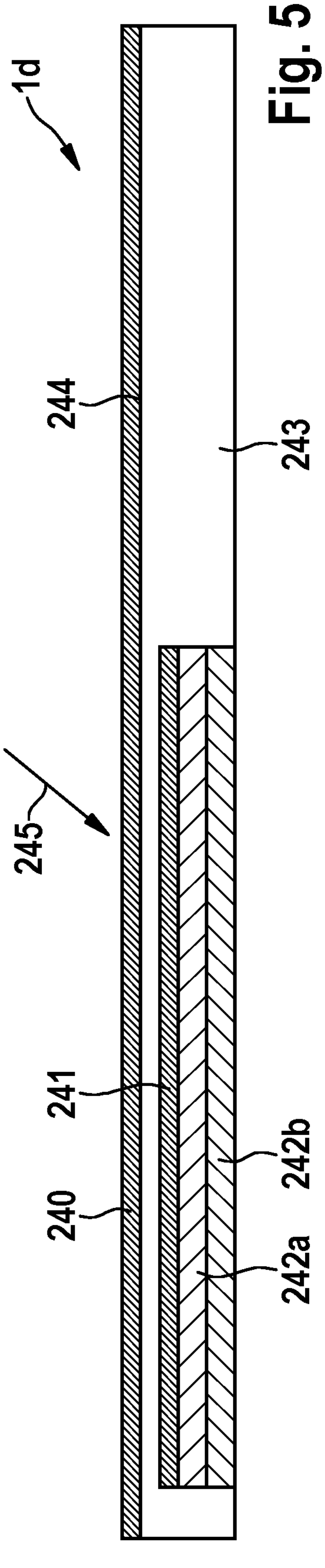
FIG. 5 shows possible arrangements of the optical filter element at a fourth layer within the optical replication component, according the present invention.

FIG. 5 shows possible arrangements of the optical filter element as a fourth layer 240 and 241 within an optical replication component 1*d*. The additional fourth layer 240 and 241 is situated as before relative to the first 242*b* and second holographic element 242*a* in the direction of the incident first light beam 245. According to a first possibility, the fourth layer 240 is situated on the back side 244 of the optical replication component 1*d*. In this case, the back side 244 of the optical replication component 1*d* indicates an outer surface of the eyeglass lens 243. Another possibility is to situate the fourth layer 241 on an outer surface of the second holographic optical element 242*a*. The first holographic optical element 242*b*, the second holographic optical element 242*a* and the fourth layer 241 are in this case integrated, in particular embedded, in the eyeglass lens 243. Alternatively or additionally, it may be provided that the optical filter element is developed as a wavelength-dependent light filter, in particular as a band-stop filter, which is designed to absorb or to reflect the incident first light beam 245 within the specific wavelength range. In this case, there is also still the possibility that this wavelength-dependent light filter is developed as the eyeglass lens 243 as such.

Figure 6:
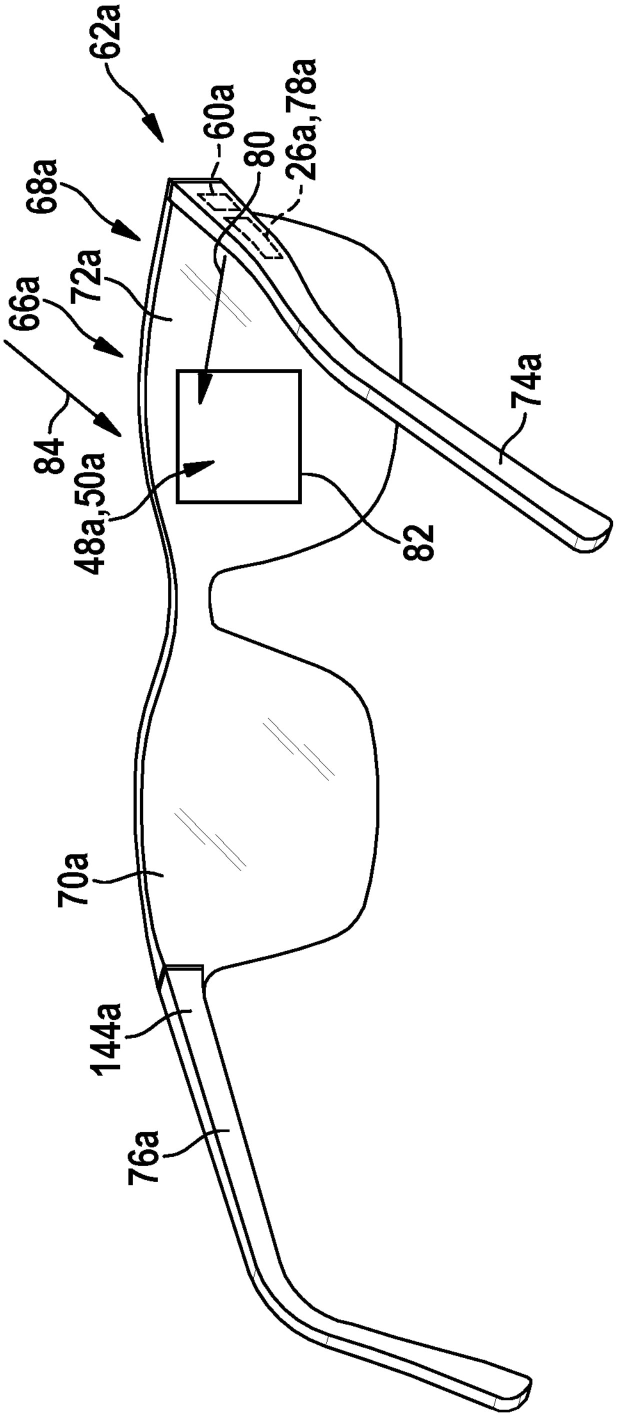
FIG. 6 shows a pair of smart glasses with an optical system, which also comprises the optical replication component, according to the present invention.

FIG. 6 shows schematically a pair of smart glasses 68*a*. The pair of smart glasses 68*a* comprises eyeglass lenses 70*a* and 72*a*. The eyeglass lenses 70*a* and 72*a* are mainly transparent. The pair of smart glasses 68*a* comprises a frame 144*a* including temple arms 74*a*, 76*a*. Smart glasses 68*a* comprise an optical system 62*a* including an image source 26*a*, which provides an image content in the form of image data, and an image processing device 78*a* for the image data. The optical system 62*a* furthermore comprises a projector unit 60*a* having a time-modulated light source for generating at least one second light beam 80 and having a controllable deflection device (not shown here) for the at least one second light beam for the scanning projection of the image content. In addition, the optical system 62*a* comprises an optical replication component 66*a*. The optical replication component 66*a* is in this case developed in planar fashion and has a front side and a back side. The optical replication component 66*a* comprises at least a first holographic optical element 48*a* and a second holographic optical element 50*a*, which may exist as a stack or in the form of a multiplexing HOE in a common layer. The first holographic optical element 48*a* and the second holographic optical element 50*a* are in this case designed to reflect an image content striking the front side of the optical replication component 66*a* in the form of the second light beam 80 in such a way that at least a first exit pupil (not shown here) and a second exit pupil, which is situated spatially offset with respect to the first, are produced with the image content. In addition, the optical replication component has an optical filter element 82 for filtering at least a first light beam 84 striking the back side of the optical replication component 66*a* in a specific angle of incidence range and/or a specific wavelength range and/or with a specific polarization direction.

The invention claimed is:

1. An optical replication component which is developed in planar fashion and has a front side and a back side, the optical replication component comprising:

at least a first holographic optical element;

a second holographic optical element, the at least first holographic optical element and the second holographic optical element being configured to reflect an image content striking the front side of the optical replication component in such a way that at least a first exit pupil and a second exit pupil, which is spatially offset with respect to the first exit pupil, are produced with the image content; and an additional optical filter element configured to filter at least a first light beam striking the back side of the optical replication component: (i) in a specific angle of incidence range, and/or (ii) in a specific wavelength range, and/or (iii) with a specific polarization direction, wherein the additional optical filter element is configured to prevent formation of ghost images caused by light beams that would otherwise propagate between the first and second holographic optical elements and reach the exit pupils.

2. The optical replication component as recited in claim 1, wherein the first holographic optical element is configured to produce image data in the first exit pupil and the second holographic optical element is configured to produce the image data in the second exit pupil.

3. The optical replication component as recited in claim 1, wherein the additionally optical filter element is a third holographic optical element, which is configured to reflect the incident first light beam at least partially.

4. The optical replication component as recited in claim 3, wherein the first holographic optical element includes first holographic lattice planes having a first lattice vector, the second holographic optical element includes second holographic lattice planes having a second lattice vector, the third holographic optical element includes third holographic lattice planes having a third lattice vector, the third lattice vector corresponding to a mirroring of a fifth lattice vector combining the first and the second lattice vector as a mean of a sum of the first and the second lattice vector, at a mirror plane, the mirror plane being oriented substantially perpendicularly with respect to a line connecting a point of incidence of the incident first light beam on the third holographic optical element with a center point between the first and the second exit pupil.

5. The optical replication component as recited in claim 3, wherein the first holographic optical element includes first holographic lattice planes having a first lattice vector, the third holographic optical element includes fourth holographic lattice planes having a fourth lattice vector, a first straight line, which runs parallel to the first lattice vector, and a fourth straight line, which runs parallel to the fourth lattice vector, being situated relative to each other at an angular offset in a range from 10° to 30°, and the fourth lattice vector has a local magnitude, in a range from 0.0395 1/nm to 0.0427 1/nm, or from 0.0343 1/nm to 0.0368 1/nm, or from 0.0275 1/nm to 0.0302 1/nm.

6. The optical replication component as recited in claim 3, wherein the third holographic optical element has a diffraction efficiency in a range from 20% to 95%.

7. The optical replication component as recited in claim 1, wherein the optical filter element includes multiple holographic optical elements for reflecting first light beams in the specific angle of incidence range and in a red and/or blue and/or green wavelength range.

8. The optical replication component as recited in claim 1, wherein the additional optical filter element is a wavelength-dependent light filter which is configured to absorb or to reflect the incident first light beam within the specific wavelength range.

9. The optical replication component as recited in claim 8, wherein the wavelength-dependent light filter is an eyeglass lens.

10. The optical replication component as recited in claim 1, wherein the optical filter element is a polarization filter, the polarization filter being configured to suppress a polarization component of the first light beam at least partially, the polarization component being oriented substantially along a vertical direction.

11. The optical replication component as recited in claim 10, wherein the polarization filter is configured to suppress at least 80% of the polarization component of the first light beam.

12. The optical replication component as recited in claim 1, wherein the first holographic optical element is a first holographic layer, and the second holographic optical element is a second holographic layer, the first and the second layer being stacked one above the other, and the first layer being situated first in a stack sequence, in a direction of an eye of the user.

13. The optical replication component as recited in claim 1, wherein the first and second holographic optical element are developed as a common third layer including as a multiplexing holographic optical element (HOE).

14. The optical replication component as recited in claim 1, wherein the additional optical filter element is developed as an additional fourth layer, the additional fourth layer being situated relative to the first and second holographic element in a direction of the incident first light beam.

15. The optical replication component as recited in claim 14, wherein the fourth layer is situated on the back side of the optical replication component on an outer surface of an eyeglass lens.

16. The optical replication component as recited in claim 14, wherein the fourth layer is situated on an outer surface of the second holographic optical element.

17. An optical system for a virtual retinal display, comprising:

a. an image source which provides an image content in the form of image data, b. an image processing device configured to process the image data;

c. a projector unit having a time-modulated light source configured to generate at least one second light beam and having a controllable deflection device for the at least one light beam for a scanning projection of the image content, d. an optical replication component developed in planar fashion and having a front side and a back side, the optical replication component including:

at least a first holographic optical element;

a second holographic optical element, the at least first holographic optical element and the second holographic optical element being configured to reflect the image content striking the front side of the optical replication component in such a way that at least a first exit pupil and a second exit pupil, which is spatially offset with respect to the first exit pupil, are produced with the image content; and an additional optical filter element configured to filter at least a first light beam striking the back side of the optical replication component: (i) in a specific angle of incidence range, and/or (ii) in a specific wavelength range, and/or (iii) with a specific polarization direction;

wherein the additional optical filter element is configured to prevent formation of ghost images caused by light beams that would otherwise propagate between the first and second holographic optical elements and reach the exit pupils.

18. Smart glasses, comprising:

an optical system for a virtual retinal display, including:

a. an image source which provides an image content in the form of image data, b. an image processing device configured to process the image data;

c. a projector unit having a time-modulated light source configured to generate at least one second light beam and having a controllable deflection device for the at least one light beam for a scanning projection of the image content, d. an optical replication component developed in planar fashion and having a front side and a back side, the optical replication component including:

at least a first holographic optical element;

a second holographic optical element, the at least first holographic optical element and the second holographic optical element being configured to reflect the image content striking the front side of the optical replication component in such a way that at least a first exit pupil and a second exit pupil, which is spatially offset with respect to the first exit pupil, are produced with the image content; and an additional optical filter element configured to filter at least a first light beam striking the back side of the optical replication component: (i) in a specific angle of incidence range, and/or (ii) in a specific wavelength range, and/or (iii) with a specific polarization direction;

wherein the additional optical filter element is configured to prevent formation of ghost images caused by light beams that would otherwise propagate between the first and second holographic optical elements and reach the exit pupils.

* * * * *